United States Patent
Aiba et al.

(10) Patent No.: US 11,157,262 B2
(45) Date of Patent: Oct. 26, 2021

(54) PROGRAM UPDATING DEVICE, PROGRAM UPDATING SYSTEM AND PROGRAM UPDATING METHOD

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Shinichi Aiba, Mie (JP); Hiroshi Ueda, Mie (JP); Masayuki Inoue, Mie (JP); Hiroshi Tateishi, Mie (JP); Shogo Kamiguchi, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/761,352

(22) PCT Filed: Oct. 19, 2018

(86) PCT No.: PCT/JP2018/039002
§ 371 (c)(1),
(2) Date: May 4, 2020

(87) PCT Pub. No.: WO2019/087820
PCT Pub. Date: May 9, 2019

(65) Prior Publication Data
US 2021/0173628 A1    Jun. 10, 2021

(30) Foreign Application Priority Data
Nov. 6, 2017 (JP) .............................. JP2017-213861

(51) Int. Cl.
*G06F 8/65* (2018.01)
*H04L 29/08* (2006.01)

(52) U.S. Cl.
CPC ................ *G06F 8/65* (2013.01); *H04L 67/12* (2013.01)

(58) Field of Classification Search
USPC ........................................................ 717/168
See application file for complete search history.

(56) References Cited

U.S. PATENT DOCUMENTS

| 7,667,580 B2* | 2/2010 | Tauchi | B60R 25/33 340/426.11 |
| 2017/0200329 A1* | 7/2017 | Rajakondala | G01P 1/06 |

(Continued)

FOREIGN PATENT DOCUMENTS

| JP | 2006-143049 A | 6/2006 |
| JP | 2014-118071 A | 6/2014 |
| JP | 2016-060407 A | 4/2016 |

OTHER PUBLICATIONS

Rob M.; "How Does a Tesla Over-the-Air Software Update Work?"; Teslarati.com website (full url in ref.]; Jun. 21, 2014 (Year: 2014).*

(Continued)

*Primary Examiner* — Wei Y Zhen
*Assistant Examiner* — Clint Thatcher
(74) *Attorney, Agent, or Firm* — Honigman LLP (57) ABSTRACT

Provided is a program updating device, program updating system, and a program updating method for updating a program without imposing a load on a user. A program updating device ("PUD") includes a communication unit transmitting/receiving information to/from an in-vehicle device operating on a software program, the PUD transmitting update information of a software program from the communication unit to execute update processing, further including: a determination unit configured to determine (Continued)

whether an operation switch of a vehicle has been switched from an on-state to an off-state; a state control unit configured to, if it is determined that the operation switch has been switched to the off-state, instruct to transition to a driving-prohibition state and hold an ignition-on state; and an update processing unit configured to start update processing based on the update information after confirming of a state is made.

12 Claims, 7 Drawing Sheets

(56) References Cited

U.S. PATENT DOCUMENTS

| | | | | |
|---|---|---|---|---|
| 2018/0203683 | A1* | 7/2018 | Kim | G06F 1/3212 |
| 2020/0174778 | A1* | 6/2020 | David | H04L 67/34 |
| 2020/0272451 | A1* | 8/2020 | Inoue | B60W 50/045 |

OTHER PUBLICATIONS

"Understanding Sleep Mode"; VisibleTesla.com website [full url in ref.]; Apr. 20, 2015 (Year: 2015).*

Roger Schlueter; "This is Why They Don't Put Carbon Monoxide Detectors in Cars"; Belleville News—Democrat newspaper online website (bnd.com) [full url in ref.]; Oct. 20, 2017 (Year: 2017).*

The Tesla Team; "Putting the Tesla HEPA Filter and Bioweapon Defense Mode to the Test"; Tesla.com website [full url in ref.]; May 2, 2016 (Year: 2016).*

H. Mansor et al; "Don't Brick Your Car: Firmware Confidentiality and Rollback for Vehicles"; 2015 10th International Conference on Availability, Reliability and Security (pp. 139-148); 2015 (Year: 2015).*

Michael Sena; "Secure Over-the-Air Vehicle Software Updates"; Collaboration on Intelligent Transport Systems Communication Standards; Nov. 25, 2015 (Year: 2015).*

International Search Report, Application No. PCT/JP2018/039002, dated Dec. 18, 2018. ISA/Japan Patent Office.

* cited by examiner

PROGRAM UPDATING DEVICE, PROGRAM UPDATING SYSTEM AND PROGRAM UPDATING METHOD

CROSS-REFERENCE TO RELATED APPLICATIONS

This application is the U.S. national stage of PCT/JP2018/039002 filed on Oct. 19, 2018, which claims priority of Japanese Patent Application No. JP 2017-213861 filed on Nov. 6, 2017, the contents of which are incorporated herein.

TECHNICAL FIELD

The present disclosure relates to a program updating device, a program updating system, and a program updating method.

BACKGROUND

In recent vehicles, a large number of ECUs (Electronic Control Units) that perform processing based on control programs stored therein are used as in-vehicle control devices, and these ECUs realize various types of functions in cooperation with each other. If there is a problem such as a bug in the software, even if only in some of the ECUs, the entirety of the in-vehicle control system may be affected. As such, it is desired for the program to be updated to a new version in which the detected bug has been fixed as soon as possible.

Conventional program updating has been executed by, for example, a method in which an expert engineer of a dealer connects a so-called scan tool terminal to an in-vehicle device in which a diagnosis terminal is accessible, and transmits an update program from the scan tool terminal to an in-vehicle network via this in-vehicle device. However, in such a method, the user is required to bring the vehicle to the dealer each time the program is updated, whereas the dealer cannot handle a plurality of vehicles at the same time, and thus updating is not appropriately executed.

In view of this, it has been proposed that program updating is executed as soon as possible without imposing a burden on a user, by using a so-called OTA (over the air) updating in which an update program is wirelessly distributed from a server to vehicles (as an example, please refer to JP 2006-143049A).

Once an update program is wirelessly received, program updating can be executed any time, but program updating should be executed in a state where driving of the vehicle is prohibited rather than while driving the vehicle, otherwise it may be dangerous. In view of this, the program is updated in a state where the vehicle is stopped/parked and electric power is supplied from a battery in an ignition-off state. However, since program updating may consume a lot of electric power in some cases, there is a possibility that program updating will consume all of the battery power.

In JP 2006-143049A, when the vehicle is parked at a prescribed place such as a parking area of the user's home or workplace, the user is urged to exit the vehicle in a state where an ignition key is inserted into the cylinder (ignition-on state), and the program is updated after confirming that the user has exited the vehicle and locked the door. In JP 2006-143049A, when the update is complete, a notification is sent to the user's mobile terminal to urge the user to return to the vehicle with an ignition-on state held, and the door is opened in accordance with a response from the mobile terminal. Then, the user operates the ignition key to put the vehicle into an ignition-off state.

If, as described in JP 2006-143049A, the user motion is necessarily required, such as exiting the vehicle in order to set the vehicle to the ignition on-state and prohibit the driving, and getting back to the vehicle in order to put the vehicle into the ignition-off state, the user may feel that this is inconvenient if updating is frequently executed.

An object of the present disclosure is to provide a program updating device, a program updating system, and a program updating method that realize implementation of program updating safely and reliably without imposing a burden on the user.

SUMMARY

A program updating device according to one aspect of the present disclosure includes a communication unit configured to transmit/receive information to/from an in-vehicle device that operates based on a software program, the program updating device being configured to transmit update information of a software program from the communication unit to execute update processing, further includes: a determination unit configured to determine whether an operation switch of a vehicle has been switched from an on-state to an off-state; a state control unit configured to, if it is determined by the determination unit that the operation switch has been switched to the off-state, instruct to transition to a driving-prohibition state of the vehicle and to hold an ignition-on state of the vehicle; and an update processing unit configured to start update processing based on the update information after confirming that the vehicle has transitioned to the driving-prohibition state and that the ignition-on state is held, in response to the instruction from the state control unit.

In the program updating device according to another aspect of the present disclosure, when the state control unit confirms that the update processing has been completed by the update processing unit, the state control unit may cancel transition to the drive prohibition state of the vehicle and holding of the ignition-on state.

In the program updating device according to another aspect of the present disclosure, if the operation switch is in the off-state when holding of the ignition-on state is cancelled, the determination unit may switch the vehicle to the ignition-off state.

In the program updating device according to another aspect of the present disclosure, the state control unit may instruct to transition to a driving prohibition state of the vehicle and hold the ignition-on state of the vehicle, and instruct to ventilate the vehicle.

The program updating device according to another aspect of the present disclosure may further include a detection device configured to detect a toxic component in the air in an interior of the vehicle, and if a toxic component of a predetermined concentration or more is detected, the update processing unit interrupts update processing, cancels transition to the driving-prohibition state of the vehicle, and cancels holding of the ignition-on state.

The program updating system according to another aspect of the present disclosure includes: a plurality of in-vehicle devices configured to operate based on a software program; a drive control device configured to control driving of a vehicle, a power supply control device configured to perform distribution processing of electric power from an in-vehicle power supply; and a program updating device that includes a communication unit configured to transmit/receive information to/from the in-vehicle devices, the drive control device, and the power supply control device, and executes update processing by sending update information corresponding to the software program from the communication unit, and the program updating device includes: a determination unit configured to determine whether an operation switch of the vehicle has been switched from an on-state to an off-state; a state control unit configured to, if it is determined by the determination unit that the operation switch has been switched to the off-state, transmit an instruction to transition to a driving prohibition state of the vehicle to the drive control device and an instruction to hold an ignition-on state of the vehicle to the power supply control device, from the communication unit; and an update processing unit configured to, when receiving a notification of completing the transition to the driving-prohibition state from the driving control device, and a notification of completing of the holding of the ignition-on state from the power supply control device, start update processing based on the update information.

The program updating method according to another aspect of the present disclosure is a program updating method performed by a system including: a plurality of in-vehicle devices configured to operate based on a software program; a drive control device configured to control driving of a vehicle, a power supply control device configured to perform distribution processing of electric power from an in-vehicle power supply; and a program updating device including a communication unit configured to transmit/receive information to/from the in-vehicle devices, the drive control device, and the power supply control device, the method for executing update processing by transmitting update information corresponding to the software program to the in-vehicle devices, the method including processing in which: the program updating device determines whether an operation switch of the vehicle has been switched from an on-state to an off-state, and if it is determined that the switch has been switched to the off state, the program updating device transmits an instruction to transition to the driving prohibition state of the vehicle to the driving control device, and an instruction to hold an ignition-on state of the vehicle to the power supply control device, from the communication unit respectively, if an instruction to transition to the driving-prohibition state is received, the driving control device prohibits driving of the vehicle, and transmits a notification of completing the transition to the program updating device, if the instruction to hold the ignition-on state is received, the power supply control device holds the ignition-on state regardless the state of the operation switch of the vehicle, and transmits a notification of completing the holding to the program updating device, and the program updating device starts update processing based on the update information if the notification of completing the transition is received from the drive control device and the notification of completing the holding is received from the power supply control device.

In an aspect of the present disclosure, when the operation switch of the vehicle is switched to the off-state and an update timing has come, the program is updated in a state where driving is prohibited, with the ignition-on state held despite of being in the off-state. In this manner, program updating can be executed safely and reliably by ensuring sufficient power supply from a drive engine rather than the battery.

In an aspect of the present disclosure, after program updating is complete in a state where the ignition-on state is held but driving is prohibited, both the driving-prohibition state and the ignition-on state are cancelled. If the switch is in the off-state, the vehicle transitions to the ignition-off state, whereas if the switch is in an accessary power-on state, the vehicle transitions to the accessary-on state.

In another aspect of the present disclosure, after program updating is complete, if the switch is in the off-state, the vehicle automatically transitions to the ignition-off state. In this manner, the vehicle automatically transitions to the ignition-off state after completion of program updating without the user operation.

In another aspect of the present disclosure, since the ignition-on state is held during program updating, the vehicle is controlled to be ventilated to prevent the vehicle interior from being a sealed space.

In another aspect of the present disclosure, if a toxic component of a prescribed concentration or more is detected during program updating, update processing is interrupted and both the driving-prohibition state and the ignition on state are cancelled. Since the user might stay in the vehicle interior during program updating while the vehicle has transitioned to the driving-prohibition state and the ignition-on state, a case can be prevented in which the state of the vehicle interior will be dangerous when the user takes a rest there.

It should be noted that the present application can be realized not only as an in-vehicle program updating device provided with the characteristic constituent elements as described above, but also as an update processing program and a storage medium storing the update processing program for causing a computer to execute the characteristic steps. Furthermore, the present application can be realized as a semiconductor integrated circuit that realizes a portion or the entirety of the constituent elements of the program updating device, other systems including a program updating system using the program updating device, or the like.

Advantageous Effects of Disclosure

According to the above-described configuration, it is possible to execute program updating reliably and safely without imposing a burden on a user.

DETAILED DESCRIPTION OF PREFERRED EMBODIMENTS

Hereinafter, specific examples of an in-vehicle communication device according to embodiments of the present disclosure will be illustrated with reference to the drawings. It should be noted that the scope of the present disclosure is indicated not by these examples but by the scope of claims, and is intended to include all modifications that are within the meanings and the scope that are equivalent to those of the scope of claims.

First Embodiment

Figure 1:
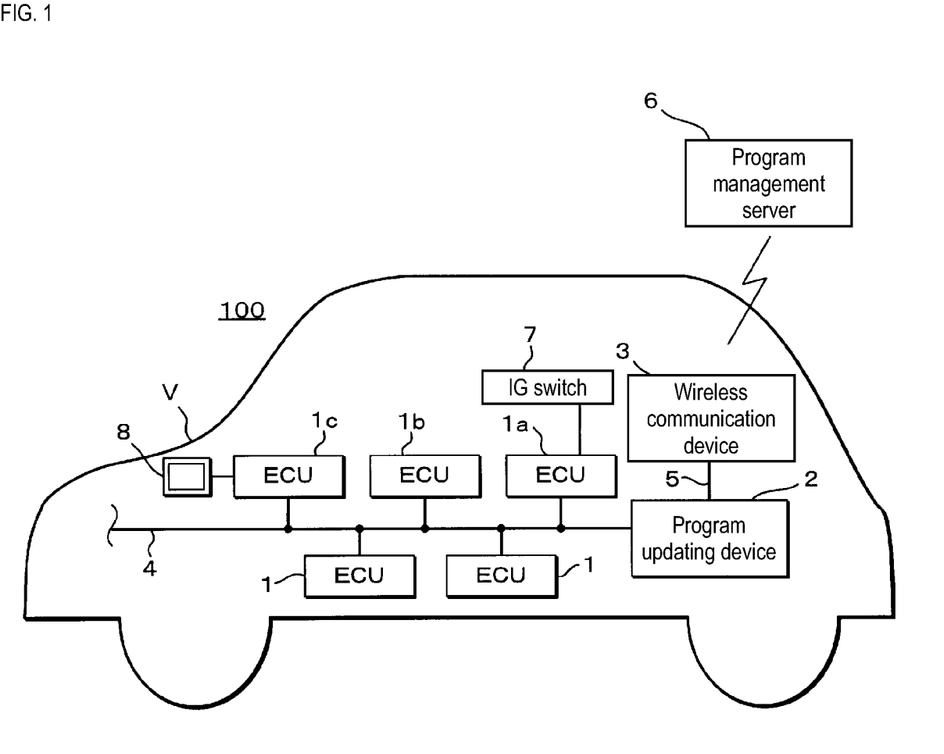
FIG. 1 is a block diagram showing a configuration of a program updating system according to a first embodiment.

FIG. 1 is a block diagram showing a configuration of a program updating system 100 according to a first embodiment. The program updating system 100 includes a plurality of ECUs 1 that are arranged in various places in a vehicle V and perform various types of control processing, a program updating device 2 that controls program updating of the ECUs 1, and a wireless communication device 3 that performs wireless communication. The ECUs 1 and the program updating device 2 are connected so that they can communicate with each other via a communication bus 4 that is a CAN (Control Area Network) bus, for example. The program updating device 2 and the wireless communication device 3 are connected so that they can communicate with each other via the communication line 5, and the wireless communication device 3 can wirelessly communicate with a program management server 6, which is an external device.

The plurality of ECUs 1 include a power supply control ECU 1a, a drive control ECU 1b, and ECUs 1c for controlling in-vehicle devices such as a monitor 8. Aside from these, it goes without saying that various other types of the ECUs 1 are also included.

The power supply control ECU 1a is connected to a key cylinder of the ignition key or an IG (Ignition) switch 7, which is an on/off switch, and detects key operations of the user of the vehicle V. A configuration is also possible in which the power supply control ECU 1a is connected to a power supply such as a battery and an alternator, and realizes processing of increasing power distribution efficiency and the like. Also, the power supply control ECU 1a may also be a BCM (Body Control Module) that collects information from car body-system sensors such as a courtesy switch, and controls operations of car body-system actuators such as a door lock and a vehicle lamp.

The drive control ECU 1b is a device that outputs instructions to a device that controls driving of the vehicle V, based on information obtained via the communication bus 4. The drive control ECU 1b notifies the state of the IG switch 7, that driving is prohibited, outputs an instruction to operate a brake control, an instruction to change a steering angle appropriately, and the like, to the target devices.

ECU 1c is a device that displays information in the monitor 8 based on information obtained via the communication bus 4, and detects a user operation in response to the displayed information. A display with embedded touch panel is used for the monitor 8, for example. In this case, the ECU 1c may also be a navigation ECU. Also, the monitor 8 may also be a HUD (Head Up Display). In this case, the ECU 1c may detect the user operation via operation buttons separately provided to an instrumental panel, a steering column, or the like.

The program updating device 2 is a device that performs processing for sending an update program received from the program management server 6 by the wireless communication device 3 to the communication bus 4 with any one of the target ECUs 1 serving as the destination. It should be noted that the program updating device 2 may also be a gateway device that is also connected to other communication buses (not shown) and relays information with different communication media (communication bus 4, other communication buses, and the communication line 5).

Figure 2:
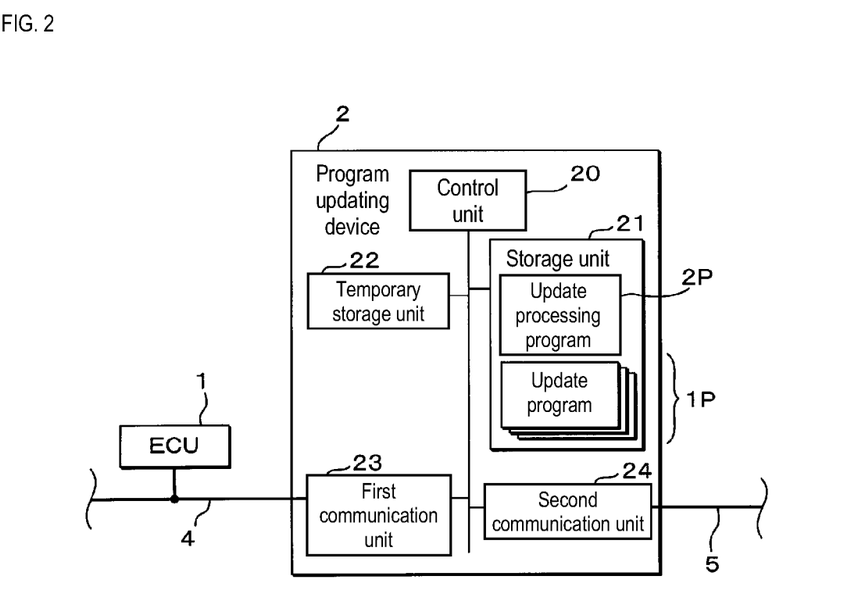
FIG. 2 is a block diagram showing an internal configuration of a program updating device.
Figure 3:
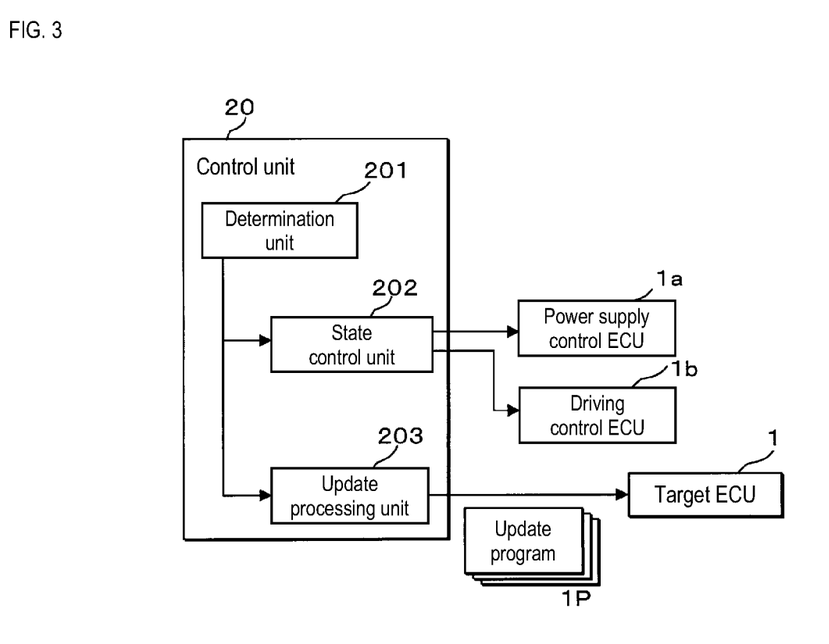
FIG. 3 is a functional block diagram of the program updating device.

FIG. 2 is a block diagram showing an internal configuration of the program updating device 2, and FIG. 3 is a functional block diagram of the program updating device 2. The program updating device 2 is provided with a control unit 20, a storage unit 21, a temporary storage unit 22, a first communication unit 23, and a second communication unit 24. A computation processing device such as a CPU (Central Processing Unit) or an MPU (Micro Processing Unit) is used for the control unit 20. The control unit 20 functions as a determination unit 201, a state control unit 202, and an update processing unit 203 by reading out and executing an update processing program 2P stored in the storage unit 21. The functions will be described in detail later.

A non-volatile memory such as a flash memory is used for the storage unit 21. The storage unit 21 stores the update processing program 2P executed by the control unit 20, and when the device functions as a gateway, the storage unit 21 stores the corresponding control programs, and various types of information to be referred during processing. The update processing program 2P and the control program may also be stored in a ROM or the like embedded in the control unit 20. Furthermore, the storage unit 21 stores a plurality of update programs 1P that are received from the program management server 6 via the wireless communication device 3 as necessary.

A volatile memory such as a DRAM (Dynamic Random Access Memory) is used for a temporary storage unit 22, which temporarily stores information generated during processing performed by the control unit 20.

A CAN controller and a CAN transceiver are used for the first communication unit 23. The first communication unit 23 transmits/receives information via the communication bus 4 to which the plurality of ECUs 1 are connected. The second communication unit 24 transmits/receives information in compliance with a communication protocol with the wireless communication device 3 via the communication line 5.

In the program updating system 100 configured as above, as shown in FIG. 3, the control unit 20 of the program updating device 2 functions as the determination unit 201, the state control unit 202, and the update processing unit 203 in cooperation with the constituent units. The determination unit 201 has a function of determining whether it is time for updating. The control unit 20, such as the determination unit 201, determines the state, such as whether the update program 1P is present, whether the update program 1P has been received, whether the program needs to be updated, whether update processing is in progress, and the like, and instructs the state control unit 202 and the update processing unit 203 to perform processing based on the determined state. The state control unit 202 stores the state that transitions in response to the instructions from the determination unit 201, and outputs operating instructions to the related ECUs 1 including the power supply control ECU 1a and the drive control ECU 1b according to the state. The update processing unit 203 actually sends, to the target ECU 1, the update program 1P that has been received in the storage unit 21, in response to the instruction from the determination unit 201.

Figure 4:
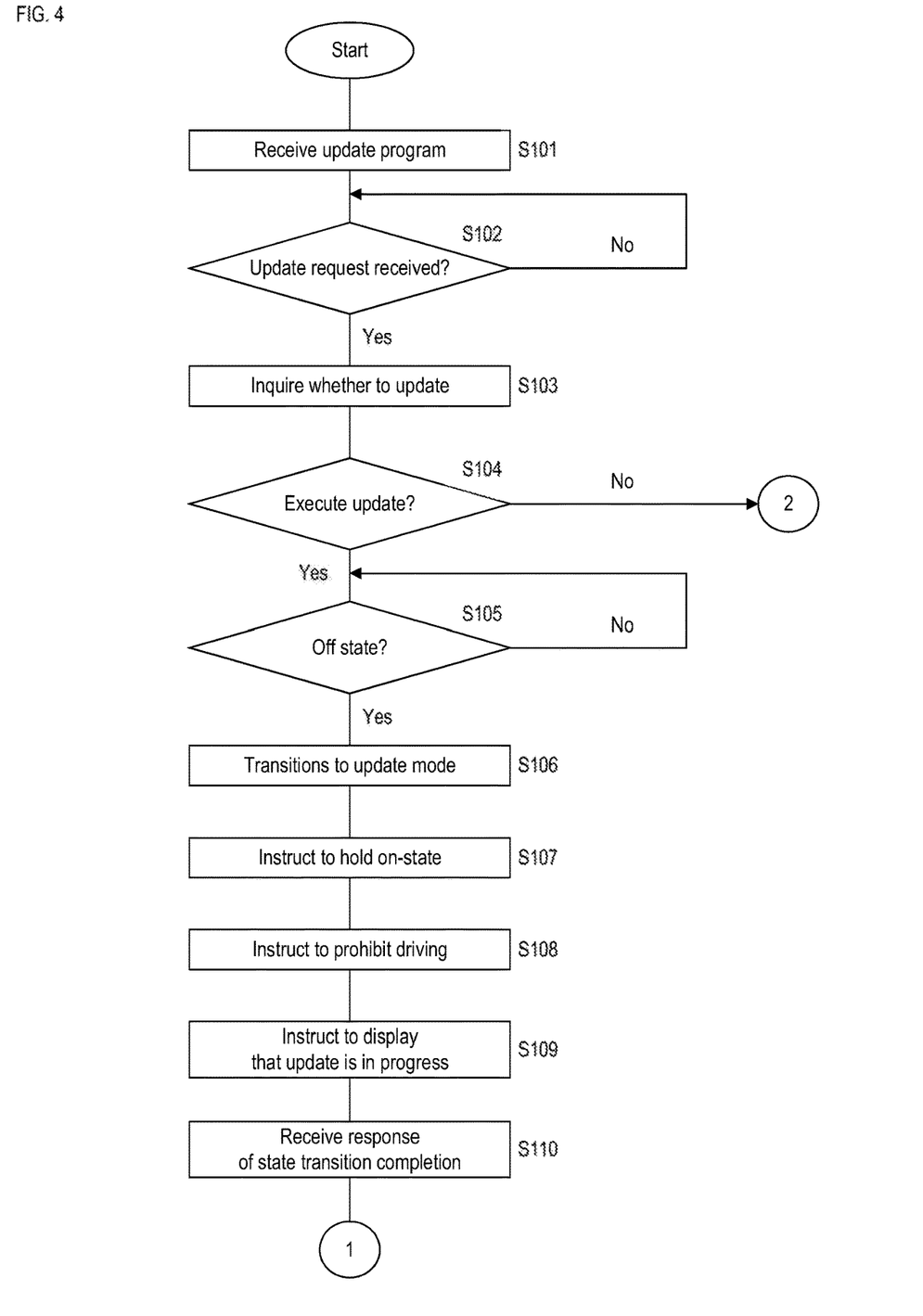
FIG. 4 is a flowchart showing an example of a program update processing procedure performed by the program updating device.
Figure 5:
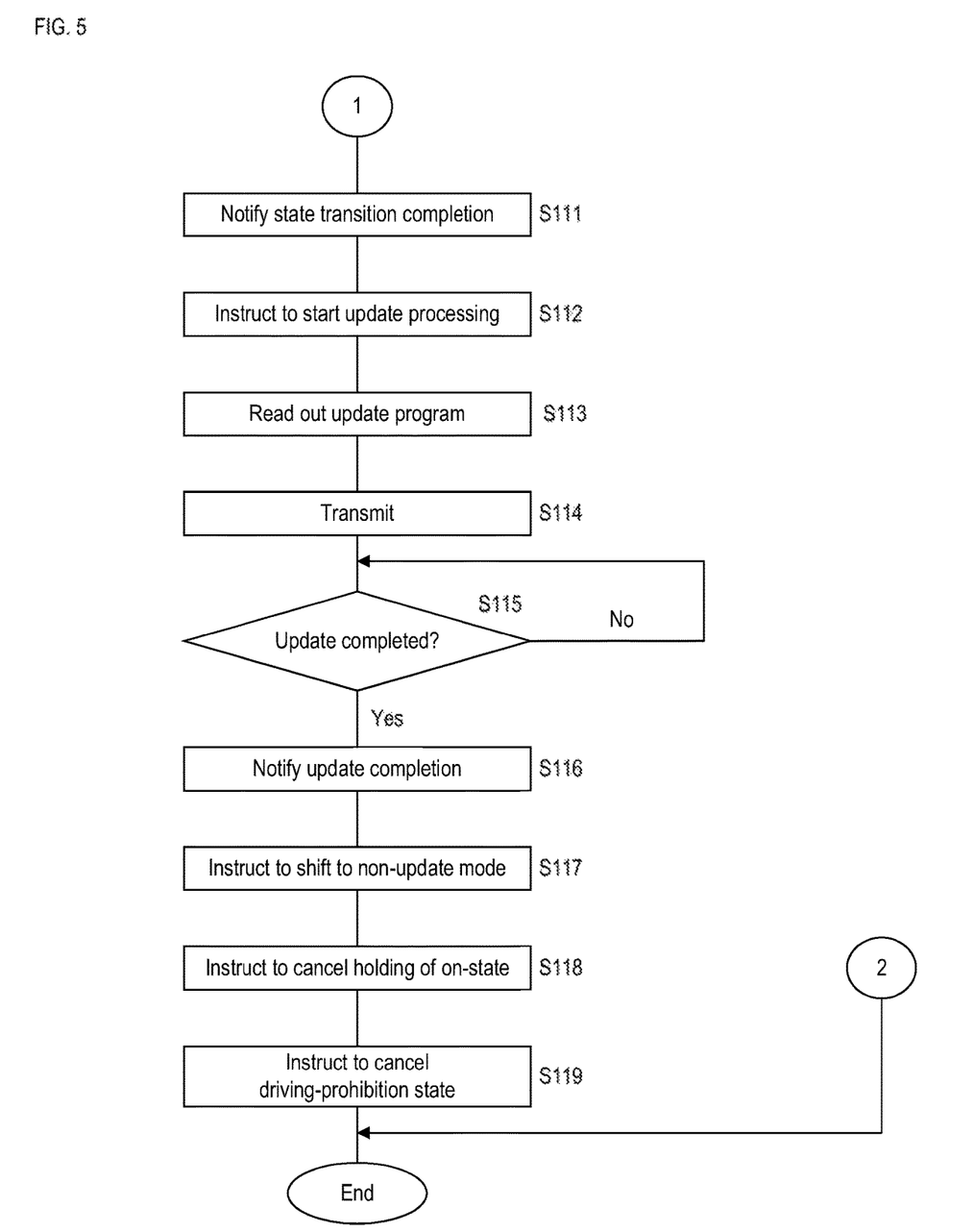
FIG. 5 is a flowchart showing an example of a program update processing procedure performed by the program updating device.

FIGS. 4 and 5 are flowcharts showing an example of a program update processing procedure executed by a program updating device 2. The control unit 20 performs processing described below if the vehicle V is in the ignition on state (on-state). The control unit 20 receives the update program 1P from the program management server 6 via the second communication unit 24 (step S101), and determines whether an update request for the received update program 1P has been received from the program management server 6 (step S102). If it is determined that no update request has been received (S102: NO), the control unit 20 returns the processing to step S102, and waits until it is determined that an update request has been received. Reception of the update program 1P in step S101 may be performed after confirming whether an update is present by the control unit 20 regularly communicating with the program management server 6 via the second communication unit 24.

If it is determined that an update request has been received in step S102 (S102: YES), the control unit 20 transmits an instruction to display a screen for notifying that an update program is present and inquiring whether to update the program, to the ECU 1c from the first communication unit 23 (step S103). The control unit 20 determines whether a response of "yes" has been received from the ECU 1c (step S104), and if it is determined that no response of "yes" has been received (S104: NO), the control unit 20 ends the processing. The case where no response of "yes" has been received means a case where a prescribed time period as a time window that is required for the response has elapsed, or a case where a response of "no" has been received, and in this case, the control unit 20 may display again the screen for inquiring whether to update the program after a prescribed time period set in consideration for the case where the vehicle is driving has elapsed.

If it is determined that a response of "yes" has been received in step S104 (S104: YES), the control unit 20, serving as the determination unit 201, determines whether the IG switch 7 has been switched to the off-state (step S105). Since it is determined whether it is time for updating the program in step S105, it is favorable to determine whether the vehicle has stopped, and whether the scheduled parking time of the vehicle V is sufficient for completing the update, in addition to the state of the switch, i.e. whether the IG switch 7 has been switched to the off-state. In the first embodiment, whether the IG switch 7 has been switched from the on-state to the off-state is determined based on whether the switching has been notified by the power supply control ECU 1a. If it is determined that the IG switch 7 has not been switched to the off-state (S105: NO), the control unit 20 returns the processing to step S105 and waits until it is determined that the IG switch 7 has been switched to the off-state.

If it is determined that the IG switch 7 has been switched to the off-state (S105: YES), the control unit 20 uses the function of the determination unit 201 to set the program updating system 100 to an update mode, and instructs the state control unit 202 to transition to the update mode (step S106).

The control unit 20 uses the function of the state control unit 202 to transmit an instruction to hold the ignition-on state, in other words, hold the drive engine or the drive motor on (update mode) even when the IG switch 7 is in the off-state, from the first communication unit 23 to the power supply control ECU 1a (step S107). In this case, the power supply control ECU 1a may set a restriction that ensures the IG switch 7 is held in the same state. Also, the control unit 20 uses the function of the state control unit 202 to transmit an instruction to prohibit driving (update mode) from the first communication unit 23 to the drive control ECU 1b (step S108). As a result, driving is prohibited with the drive engine or the drive motor of the vehicle V held on. The control unit 20 may send an instruction to the ECU 1c for controlling the monitor 8 to display a screen for notifying that an update is in progress (step S109). It is preferable that the screen for notifying that the update is in progress also displays a message indicating that the IG switch 7 and the other in-vehicle devices cannot be operated.

Thereafter, upon receiving the response as to whether the state transition has been completed from both the power supply control ECU 1a and the drive control ECU 1b (step S110), the control unit 20 uses the function of the state control unit 202 to notify the determination unit 201 that the transition to the update mode has been completed to (step S111).

The control unit 20 causes the determination unit 201 to perform processing to confirm completion of transition to the update mode, and then instruct the update processing unit 203 to start update processing (step S112).

The control unit 20 uses the function of the update processing unit 203 to read out one or a plurality of update programs 1P stored in the storage unit 21 (step S113) and transmit an update instruction and the update program 1P from the first communication unit 23 to the ECU 1 to be updated that corresponds to the update program 1P (step S114). As a result, in the target ECU 1, the update is executed based on the update instruction with the update program 1P that was received with the update instruction. As described above, since the update is performed in a state where driving is prohibited while the drive engine or the drive motor of the vehicle V is held on, the battery is not consumed and the user can stay inside the vehicle. Upon completing the update, the target ECU 1 transmits an update completion notification to the program updating device 2.

The control unit 20 uses the function of the update processing unit 203 to determine whether the update completion notification has been received (step S115), and if not (S115: NO), returns the processing to step S115 and waits until it is determined that the notification has been received. If it is determined that the notification has been received in step S115 (S115: YES), the control unit 20 notifies the determination unit 201 of completion of the update (step S116).

Upon confirming the completion of update, the control unit 20 uses the function of the determination unit 201 to set the program updating system 100 to a non-update mode and instructs the state control unit 202 to transition to a non-update mode (step S117).

The control unit 20 uses the function of the state control unit 202 to transmit an instruction to cancel holding of the ignition-on state and start the drive engine or the drive motor in accordance with the state of the IG switch 7 (non-update (normal) mode) from the first communication unit 23 to the power supply control ECU 1a (step S118). Also, the control unit 20 uses the function of the state control unit 202 to cancel the driving-prohibition state and transmit an instruction to the driving control ECU 1b to allow driving in accordance with the state of the IG switch 7 (non-updating (normal) mode) from the first communication unit 23 (step S119). In this manner, the drive engine or the drive motor of the vehicle V is controlled by the power supply control ECU 1a in accordance with the state of the IG switch 7. Since the IG switch 7 is assumed to be held in the off-state in step S105 and not have been operated from then, the drive engine or the drive motor stops and the vehicle shifts to the ignition-off state, and the processing ends.

When the IG switch 7 shifts from the off-state to the on-state, and the program updating device 2 is started for the first time after completion of the update, the control unit 20 may transmit an instruction to display the screen for notifying that updating is complete to the ECU 1c for controlling the monitor 8.

In this manner, after the user switches the IG switch 7 to the off-state and it is determined that an update timing has come, the program is updated with the update program 1P in a state where driving is prohibited with the ignition-on state held. Accordingly, it is possible to safely ensure sufficient power supply from the drive engine rather than the battery, and reliably update the program. Since updating is executed after confirming that driving has been prohibited (transitioned to the update mode) by the driving control ECU 1b, it is not necessary to forcibly make the user exit the vehicle. Even if a user who stays inside the vehicle mistakenly operates a gear box or an accelerator in the update mode, the vehicle V does not drive. Also, after the user parks the vehicle V and turns off the IG switch 7, the user may exit the vehicle with the ignition held to on, lock the door, and leave the site. While the user is away from the vehicle, the update progresses, and when the update is complete, the vehicle automatically transitions to the ignition-off state, and thus the user is not required to perform any particular operation when getting into the vehicle next time. In this manner, in the program updating system 100 according to the present disclosure, it is not necessary for the user to be conscious about program updating aside from operating for responding to the inquiry as to whether to update the program. Note that by confirming whether to update the program, it is possible to prevent the user from feeling a sense of discomfort or mistakenly recognizing as a failure that the ignition-on state of the vehicle V is held after turning off the IG switch 7.

Second Embodiment

Figure 6:
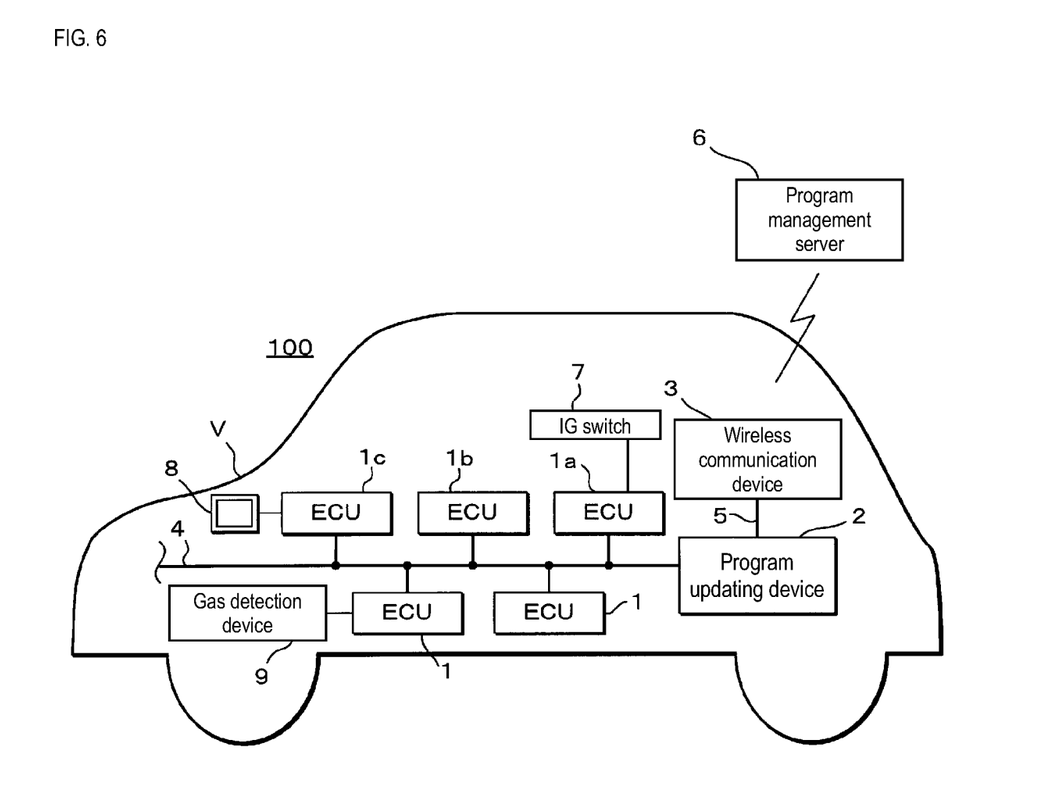
FIG. 6 is a block diagram showing a configuration of a program updating system according to a second embodiment.

FIG. 6 is a block diagram showing the configuration of a program updating system 100 according to a second embodiment. In the program updating system 100 according to the second embodiment, aside from that a gas detection device 9 is connected to one ECU 1 that is connected to the communication bus 4 and processing is performed as illustrated below with respect to the gas detection device 4, the constituent elements are the same as those as in the first embodiment. Accordingly, the same constituent elements are given the same reference signs and their further description will be omitted.

The gas detection device 9 includes a sensor for detecting a concentration of toxic gas (carbon monoxide) in the vehicle interior, and outputs the detection result to the ECU 1.

Figure 7:
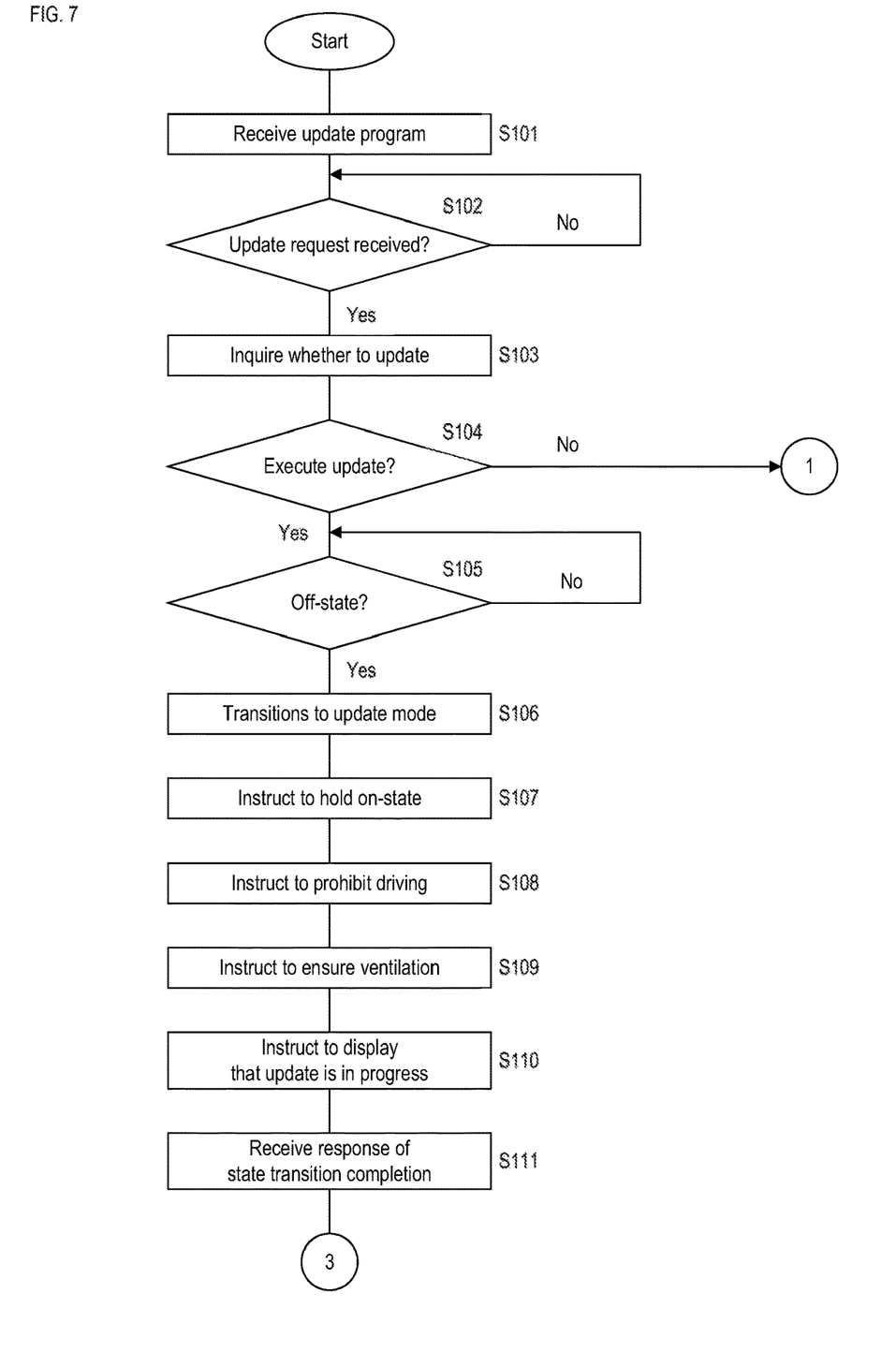
FIG. 7 is a flowchart showing an example of a processing procedure performed by a program updating device according to the second embodiment.
Figure 8:
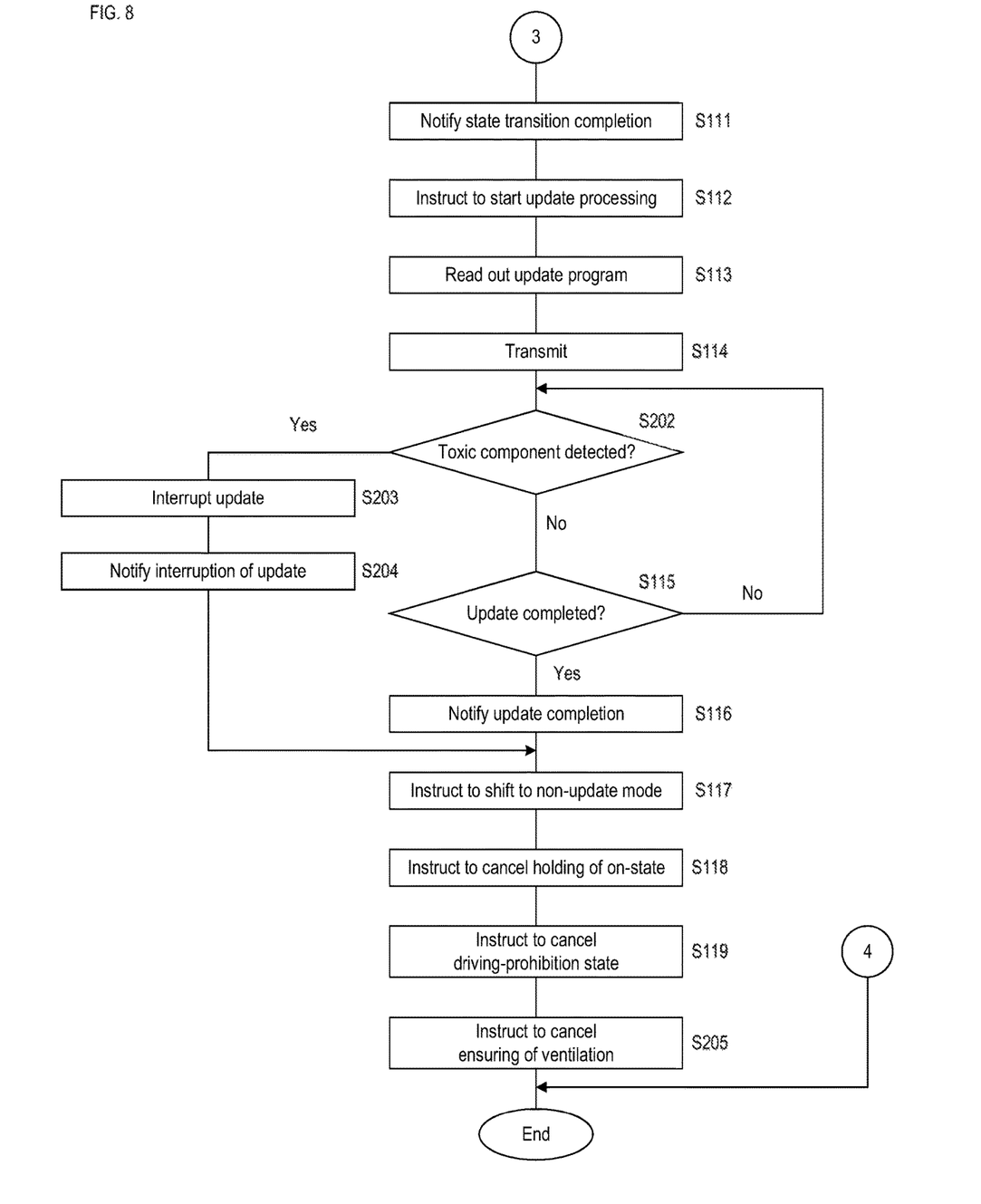
FIG. 8 is a flowchart showing an example of a processing procedure performed by the program updating device according to the second embodiment.

FIGS. 7 and 8 are flowcharts showing an example of a processing procedure executed by a program updating device 2 according to the second embodiment. Note that in the processing procedures shown in the flowcharts in FIGS. 7 and 8, the same procedures as in the first embodiment as in the flowcharts in FIGS. 4 and 5 are given the same step numbers and their further description will be omitted.

In the second embodiment, when instructing to shift to the update mode (S107 and S108), the control unit 20 similarly uses a function of the state control unit 202 to instruct an air-conditioning ECU 1 to ventilate the vehicle interior, although temperature adjustment is not necessarily required (step S201). Then, the control unit 20 transmits an instruction to display a screen for indicating that the update is in progress from the first communication unit 23 to the ECU 1c (S109).

Thereafter, upon sending the update program 1P from the first communication unit 23 to start the update, the control unit 20 determines whether the detection of a toxic component (carbon monoxide of at least a prescribed concentration) has been received from the corresponding ECU 1 by the gas detection device 9 (step S202). If it is determined that no notification of detection has been received (S202: NO), the control unit 20 proceeds the processing to step S115.

If it is determined that notification has been received that the toxic component has been detected by the gas detection device 9 (S202: YES), the control unit 20 interrupts the update processing performed by the update processing unit 203 (step S203), and notifies the determination unit 201 that the update has been interrupted (step S204).

Upon confirming that the update has been interrupted by the determination unit 201, the control unit 20 proceeds the processing to step S117 after storing the interruption log in the storage unit 21, and instructs to return to the non-update mode (S117). Also, the control unit 20 cancels the forcible ventilation (step S205) and ends the processing. The other processing is the same as illustrated in the first embodiment.

In the second embodiment as described above, control is performed such that air conditioning (ventilation) is forcibly performed while holding the ignition-on state, and if accumulation of toxic gas is detected in the vehicle interior during execution of the update, the update is interrupted to cancel holding of the ignition-on state. In this manner, even if the user stays in the vehicle interior to take a rest, it is possible to execute program updating more safely and reliably.

Furthermore, the update processing program 2P executed by the control unit 20 in the program updating device 2 in the present embodiment may also be provided in a computer-readable format stored in a storage medium such as an optical disk or a memory card.

The invention claimed is:

1. An automotive vehicle having an engine and an alternator, the automotive vehicle comprising:
   a power supply control device configured to direct electrical power;
   a program updating device, the program updating device including a communication unit configured to transmit/receive information to/from an in-vehicle device that operates based on a software program, the program updating device being configured to transmit update information of a software program from the communication unit to execute update processing, further including:
   a determination unit configured to determine whether an operation switch of a vehicle has been switched from an on-state to an off-state, the ignition-on state is a state where the engine is on so as to actuate the alternator;
   a state control unit configured to, if it is determined by the determination unit that the operation switch has been switched to the off-state, instruct to transition to a driving-prohibition state of the vehicle and to hold an ignition-on state of the vehicle, wherein the driving-prohibition state is a state where a driving operation of the vehicle is made inoperable even when the engine is turned on; and
   an update processing unit configured to start update processing based on the update information after confirming that the vehicle has transitioned to the driving-prohibition state and that the ignition-on state is held, in response to the instruction from the state control unit, wherein the update processing unit is further configured to instruct the power supply control device to direct electrical power from the alternator to provide power for the update.

2. The program updating device according to claim 1, wherein when the state control unit confirms that the update processing has been completed by the update processing unit, the state control unit cancels the transition to the driving-prohibition state of the vehicle and the holding of the ignition-on state.

3. The program updating device according to claim 2, wherein if the operation switch is in the off-state when holding of the ignition-on state is cancelled, the determination unit switches the vehicle to an ignition-off state.

4. The program updating device according to claim 1, wherein the state control unit instructs a transition to the driving-prohibition state of the vehicle and holds the ignition-on state of the vehicle, and instructs to ventilate the vehicle.

5. The program updating device according to claim 1, further comprising:
a detection device configured to detect a toxic component in the air in an interior of the vehicle, and
if a toxic component of a predetermined concentration or more is detected, the update processing unit interrupts update processing, cancels transition to the driving-prohibition state of the vehicle, and cancels holding of the ignition-on state.

6. An automotive vehicle having an engine and an alternator, the automotive vehicle comprising:
a plurality of in-vehicle devices configured to operate based on a software program;
a drive control device configured to control driving of a vehicle;
a power supply control device configured to perform distribution processing of electric power from the alternator; and
a program updating device that includes a communication unit configured to transmit/receive information to/from the in-vehicle devices, the drive control device, and the power supply control device, and executes update processing by transmitting update information corresponding to the software program from the communication unit, wherein
the program updating device includes:
a determination unit configured to determine whether an operation switch of the vehicle has been switched from an on-state to an off-state, the ignition-on state is a state where the engine is on so as to actuate the alternator;
a state control unit configured to, if it is determined by the determination unit that the operation switch has been switched to the off-state, transmit an instruction to transition to a driving-prohibition state of the vehicle to the drive control device, wherein the driving-prohibition state is a state where a driving operation of the vehicle is made inoperable even when the engine is turned on, and an instruction to hold an ignition-on state of the vehicle to the power supply control device, from the communication unit; and
an update processing unit configured to, when receiving a notification of completing the transition to the driving-prohibition state from the driving control device, and a notification of completing of the holding of the ignition-on state from the power supply control device, start update processing based on the update information, wherein the update processing unit is further configured to instruct the power supply control device to direct electrical power from the alternator to provide power for the update.

7. A program updating method performed by a system including: a plurality of in-vehicle devices configured to operate based on a software program; a drive control device configured to control driving of a vehicle, a power supply control device configured to perform distribution processing of electric power from an alternator actuated by an engine; and a program updating device including a communication unit configured to transmit/receive information to/from the in-vehicle devices, the drive control device, and the power supply control device, the method for transmitting update information corresponding to the software program to the in-vehicle devices to execute update processing, the method including processing in which:
the program updating device determines whether an operation switch of the vehicle has been switched from an on-state to an off-state, and
if it is determined that the switch has been switched to the off state, the program updating device transmits an instruction to transition to the driving-prohibition state of the vehicle to the driving control device, and an instruction to hold an ignition-on state of the vehicle to the power supply control device, from the communication unit, respectively, the ignition-on state is a state where the engine is on so as to actuate the alternator,
if an instruction to transition to the driving-prohibition state is received, wherein the driving-prohibition state is a state where a driving operation of the vehicle is made inoperable even when the engine is turned on, the driving control device prohibits driving of the vehicle, and transmits a notification of completing the transition to the program updating device,
if the instruction to hold the ignition-on state is received, the power supply control device holds the ignition-on state regardless of the state of the operation switch of the vehicle, and transmits a notification of completing of the holding to the program updating device, and
the program updating device starts update processing based on the update information if the notification of completing the transition is received from the drive control device and the notification of completing of the holding is received from the power supply control device, wherein the update processing unit is further configured to instruct the power supply control unit to direct electrical power from the alternator to provide power for the update.

8. The program updating device according to claim 2, wherein the state control unit instructs a transition to the driving-prohibition state of the vehicle and holds the ignition-on state of the vehicle, and instructs to ventilate the vehicle.

9. The program updating device according to claim 3, wherein the state control unit instructs a transition to the driving-prohibition state of the vehicle and holds the ignition-on state of the vehicle, and instructs to ventilate the vehicle.

10. The program updating device according to claim 2, further comprising:
a detection device configured to detect a toxic component in the air in an interior of the vehicle, and
if a toxic component of a predetermined concentration or more is detected, the update processing unit interrupts update processing, cancels transition to the driving-prohibition state of the vehicle, and cancels holding of the ignition-on state.

11. The program updating device according to claim 3, further comprising:
a detection device configured to detect a toxic component in the air in an interior of the vehicle, and
if a toxic component of a predetermined concentration or more is detected, the update processing unit interrupts update processing, cancels transition to the driving-prohibition state of the vehicle, and cancels holding of the ignition-on state.

12. The program updating device according to claim 4, further comprising:
a detection device configured to detect a toxic component in the air in an interior of the vehicle, and
if a toxic component of a predetermined concentration or more is detected, the update processing unit interrupts update processing, cancels transition to the driving-prohibition state of the vehicle, and cancels holding of the ignition-on state.

* * * * *